UNITED STATES PATENT OFFICE.

FRIEDRICH KÖHLER, OF LUDWIGSHAFEN AM RHEIN, ASSIGNOR TO BADISCHE ANILIN AND SODA FABRIK, OF BADEN, GERMANY.

DYE-STUFF OR COLORING-MATTER.

SPECIFICATION forming part of Letters Patent No. 224,928, dated February 24, 1880.

Application filed December 30, 1879.

*To all whom it may concern:*

Be it known that I, FRIEDRICH KÖHLER, of Ludwigshafen am Rhein, in the Empire of Germany, have invented a new and useful Improvement in Coloring-Matters or Dye-Stuffs, which improvement is fully set forth in the following specification.

This invention relates to a red coloring-matter or dye-stuff suitable for dyeing and printing, which may be termed "fast crimson," and which is capable of replacing cochineal, lac-dye, or similar dyes in some of their industrial applications. Said coloring-matter belongs to the so-called "azo" compounds, and results from the action of the diazo compound of the hereinafter-described sulpho-acid of amido-azo benzole upon an alkaline solution of beta-naphthol.

In preparing the sulpho-acid of amido-azo benzole, I mix one part of amido-azo benzole with four parts of fuming sulphuric acid containing about twenty to twenty-five per cent of anhydrous sulphuric acid, and heat this mixture during about nine hours to about 60° centigrade; then pour it afterward in water and add slaked lime and afterward soda, and obtain, in a manner well known to chemists, the sodium-salt of the sulpho-acid of amido-azo benzole. I then dissolve ten parts of the sodium-salt of the sulpho-acid of amido-azo benzole, obtained as above stated, in one hundred parts of water, and to this solution I add eleven parts of muriatic acid of the specific gravity of 1.16 to 1.17, and also about twelve parts of a fifteen-per-cent. solution of nitrite of sodium, which is added gradually until, according to well-known rules, the diazo compound is formed, which is termed in chemical language "sulpho-acid of diazo-azo benzole." This solution of the sulpho-acid of diazo-azo benzole is mixed with another solution, which is produced by mixing, say, four parts of beta-naphthol with five parts of caustic soda and forty parts of water, care being taken to maintain the mixture alkaline. From this mixture the dye-stuff is precipitated in the form of a brownish paste, which is subsequently washed, filtered, pressed, and dried, when it is ready for use. It is soluble in hot water, and dyes wool in an acidulated bath.

What I claim as new, and desire to secure by Letters Patent, is—

As a new manufacture, the red coloring-matter produced by the action of the sulpho-acid of diazo-azo benzole upon an alkaline solution of beta-naphthol, substantially as described, or by any other method which will produce a like result.

In testimony that I claim the foregoing I have hereunto set my hand and seal this 10th day of December, 1879.

FRIEDRICH KÖHLER. [L. S.]

Witnesses:
C. GLASER,
A. HANSER.